US012269254B2

(12) United States Patent
Aizawa

(10) Patent No.: US 12,269,254 B2
(45) Date of Patent: Apr. 8, 2025

(54) DIELECTRIC HEATING APPARATUS AND PRINTING SYSTEM

(71) Applicant: SEIKO EPSON CORPORATION, Tokyo (JP)

(72) Inventor: Tadashi Aizawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 174 days.

(21) Appl. No.: 18/161,251

(22) Filed: Jan. 30, 2023

(65) Prior Publication Data

US 2023/0241904 A1 Aug. 3, 2023

(30) Foreign Application Priority Data

Jan. 31, 2022 (JP) ................................ 2022-012606

(51) Int. Cl.

| | |
|---|---|
| ***B41J 11/00*** | (2006.01) |
| ***B41J 2/01*** | (2006.01) |
| ***H05B 6/46*** | (2006.01) |
| ***H05B 6/54*** | (2006.01) |
| ***H05B 6/62*** | (2006.01) |

(52) U.S. Cl.

CPC ...... *B41J 11/00216* (2021.01); *B41J 11/0021* (2021.01); *B41J 11/00242* (2021.01); *H05B 6/46* (2013.01); *H05B 6/54* (2013.01); *H05B 6/62* (2013.01)

(58) Field of Classification Search

CPC . B41J 11/002; B41J 11/0021; B41J 11/00216; B41J 2/01; H05B 6/46; H05B 6/54; H05B 6/62

See application file for complete search history.

(56) References Cited

U.S. PATENT DOCUMENTS

2017/0066254 A1* 3/2017 Inoue ................. B41J 11/00216
2017/0266986 A1* 9/2017 Yamada .................. F26B 3/347
2020/0087854 A1* 3/2020 Bertels ..................... D06P 1/44

FOREIGN PATENT DOCUMENTS

JP 2017-119395 A 7/2017

* cited by examiner

*Primary Examiner* — Justin Seo
*Assistant Examiner* — Kendrick X Liu
(74) *Attorney, Agent, or Firm* — Harness, Dickey & Pierce, P.L.C.

(57) ABSTRACT

Provided is a dielectric heating apparatus for heating a first ink and a second ink that adhere to a medium. The first ink contains carbon black, and the second ink does not contain carbon black. The dielectric heating apparatus includes: a first electrode unit as an electrode unit configured to heat the first ink and the second ink, the first electrode unit including a first electrode and a second electrode that face the medium; and a first voltage application unit configured to apply an AC voltage having a frequency of 300 MHz or more and 300 GHz or less to the first electrode and the second electrode.

5 Claims, 5 Drawing Sheets

DIELECTRIC HEATING APPARATUS AND PRINTING SYSTEM

The present application is based on, and claims priority from JP Application Serial Number 2022-012606, filed Jan. 31, 2022, the disclosure of which is hereby incorporated by reference herein in its entirety.

BACKGROUND

1. Technical Field

The present disclosure relates to a dielectric heating apparatus and a printing system.

2. Related Art

With regard to a dielectric heating apparatus, JP-A-2017-119395 discloses a technique of drying a first liquid adhering to an adhesion target such as a recording sheet by a first drying device that is a dielectric heating apparatus, causing a second liquid to adhere to the adhesion target, and then drying the adhering second liquid by a second drying device. The second liquid is a black ink containing carbon black, and the first liquid is an ink of a color other than black. Accordingly, uneven heating of the adhesion target due to a rapid temperature rise when a liquid containing carbon black is heated by dielectric heating can be prevented.

However, in JP-A-2017-119395, it is necessary to further cause the second liquid to adhere to the adhesion target after the first liquid adhering to the adhesion target is once dried by the dielectric heating apparatus. Therefore, there is a possibility that the second liquid cannot adhere to a position corresponding to the adhering first liquid in the adhesion target, and a deviation may occur in an adhesion position between the first liquid and the second liquid.

SUMMARY

According to a first aspect of the present disclosure, a dielectric heating apparatus for heating a first ink and a second ink that adhere to a medium is provided. The first ink contains carbon black, and the second ink does not contain carbon black. The dielectric heating apparatus includes: a first electrode unit as an electrode unit configured to heat the first ink and the second ink, the first electrode unit including a first electrode and a second electrode that face the medium; and a first voltage application unit configured to apply an AC voltage having a frequency of 300 MHz or more and 300 GHz or less to the first electrode and the second electrode.

According to a second aspect of the present disclosure, a printing system is provided. The printing system includes: a discharge unit including a first discharge unit configured to discharge the first ink and cause the first ink to adhere to the medium and a second discharge unit configured to discharge the second ink and cause the second ink to adhere to the medium; and a transport unit configured to transport the medium along a transport path. The electrode unit heats the first ink and the second ink downstream of a position in the transport path where the discharge unit causes the first ink and the second ink to adhere to the medium.

DESCRIPTION OF EXEMPLARY EMBODIMENTS

A. First Embodiment

Figure 1:
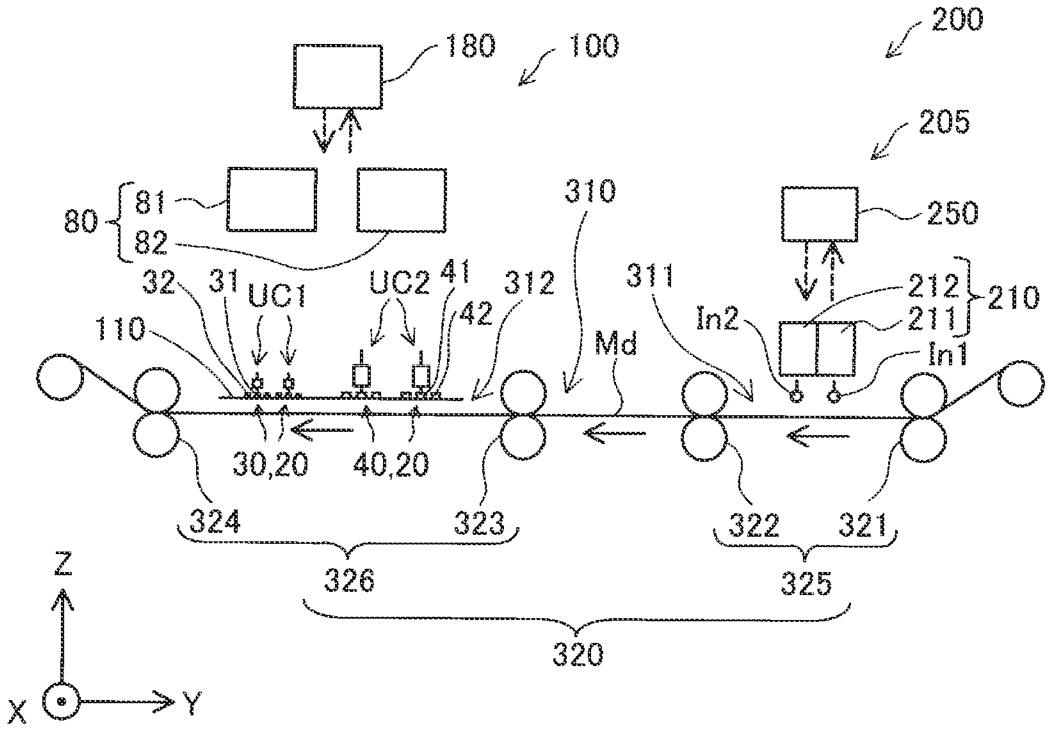
FIG. 1 is a schematic diagram showing a schematic configuration of a printing system.

FIG. 1 is a schematic diagram showing a schematic configuration of a printing system 200 according to a first embodiment. FIG. 1 shows arrows indicating X, Y, and Z directions orthogonal to one another. The X direction and the Y direction are directions parallel to a horizontal plane, and the Z direction is a direction along a vertically upward direction. The arrows indicating the X, Y, and Z directions are also appropriately shown in other drawings such that the shown directions correspond to those in FIG. 1. In the following description, when a direction is specified, a direction indicated by an arrow in each drawing is referred to as "+", a direction opposite thereto is referred to as "−", and positive and negative signs are used in combination in a direction notation. Hereinafter, a +Z direction is referred to as "upper", and a −Z direction is referred to as "lower". In the present specification, the term "orthogonal" includes a range of 90°±10°.

The printing system 200 includes a dielectric heating apparatus 100, a liquid discharge device 205, and a transport unit 320. In the printing system 200 according to the present embodiment, an ink is discharged and adheres to a medium Md by the liquid discharge device 205 while the medium Md is transported by the transport unit 320, and the ink adhering to the medium Md is heated and dried by the dielectric heating apparatus 100.

The transport unit 320 transports the medium Md along a transport path 310. In the present embodiment, the transport unit 320 includes a first roller unit 321, a second roller unit 322, a third roller unit 323, and a fourth roller unit 324 that include rollers, and a driving unit (not shown) constituted by a motor or the like for driving these rollers. In the present embodiment, the first roller unit 321, the second roller unit 322, the third roller unit 323, and the fourth roller unit 324 are disposed in this order in a −Y direction. The transport unit 320 transports the sheet-shaped medium Md in order along the −Y direction by the first roller unit 321 to the fourth roller unit 324.

In the present embodiment, a path along which the medium Md is transported by the roller units corresponds to the transport path 310. In another embodiment, the transport path 310 may be partially or entirely implemented with, for example, a belt or the like. In this case, the transport unit 320 may be implemented as a driving unit that drives the belt.

The first roller unit 321 and the second roller unit 322 constitute a first transport unit 325 that transports the medium Md in a first section 311 of the transport path 310. The third roller unit 323 and the fourth roller unit 324 constitute a second transport unit 326 that transports the medium Md in a second section 312 of the transport path 310. The second section 312 is a section of the transport path 310 downstream of the first section 311. In each section, a constant tension is applied to the medium Md. In the present embodiment, the tension applied to the medium Md in each section is different from each other. As shown in FIG. 1, the first section 311 and the second section 312 are separated from each other. The first transport unit 325 according to the present embodiment is provided in the liquid discharge device 205 and constitutes a part of the liquid discharge device 205. The second transport unit 326 is provided in the dielectric heating apparatus 100 and constitutes a part of the dielectric heating apparatus 100.

Examples of the medium Md include a sheet, cloth, a film, or the like. The cloth used as the medium Md is formed, for example, by weaving fibers such as cotton, hemp, polyester, silk, and rayon, or fibers obtained by mixing these fibers.

The liquid discharge device 205 according to the present embodiment is implemented as an inkjet printer. The liquid discharge device 205 includes a discharge unit 210 that discharges and causes the ink to adhere to the medium Md, the first transport unit 325 described above, and a discharge control unit 250. The discharge unit 210 includes a first discharge unit 211 and a second discharge unit 212. The first discharge unit 211 discharges a first ink In1 containing carbon black and causes the first ink In1 to adhere to the medium Md. The second discharge unit 212 discharges a second ink In2 not containing carbon black and causes the second ink In2 to adhere to the medium Md. In the present embodiment, the discharge unit 210 causes the first ink In1 and the second ink In2 to adhere to the medium Md in the first section 311 described above.

The discharge unit 210 is implemented by, for example, a piezoelectric or thermal liquid discharge head. The first discharge unit 211 is implemented as, for example, a head tip including a flow path through which the first ink In1 flows and a nozzle for discharging the first ink In1 in the discharge unit 210. The second discharge unit 212 is implemented as, for example, a head tip including a flow path through which the second ink In2 flows and a nozzle for discharging the second ink In2 in the discharge unit 210. The discharge unit 210 may be able to reciprocate in a direction intersecting the Y direction with respect to the medium Md by, for example, a carriage (not shown), or may be implemented as a so-called line head whose position is fixed instead of reciprocating with respect to the medium Md.

The first ink In1 and the second ink In2 according to the present embodiment are pigment inks containing a resin. The resin contained in the ink has a function of firmly fixing the pigment on the medium Md via the resin itself. Such a resin is used, for example, in a state in which the resin which is sparingly soluble or insoluble in a solvent such as water is dispersed in the solvent in a form of fine particles, that is, in an emulsion state or a suspension state. Examples of such a resin include an acrylic resin, a styrene-acrylic resin, a fluorene resin, a urethane resin, a polyolefin resin, a rosin-modified resin, a terpene resin, a polyester resin, a polyamide resin, an epoxy resin, a vinyl chloride resin, a vinyl chloride-vinyl acetate copolymer, and an ethylene-vinyl acetate resin. Two or more of these resins may be used in combination. Such a resin is also referred to as a resin.

Examples of the first ink In1 include a black ink containing carbon black and a gray ink containing carbon black. The gray ink containing carbon black can be used, for example, by dispersing a color material obtained by mixing carbon black, cyan, magenta, and yellow pigments in a solvent such as water. Similarly, the black ink containing carbon black can be used by dispersing a color material obtained by mixing the pigments in a solvent such as water. Hereinafter, the black ink obtained by dispersing the color material obtained by mixing carbon black and the pigments other than carbon black such as cyan, magenta, and yellow in a solvent such as water is referred to as a "mixed black ink". Examples of the second ink In2 include cyan, magenta, yellow, blue, white, and light magenta inks not containing carbon black. The first ink In1 may be an ink not containing carbon black as long as a rate of increase per unit time of a temperature when the ink is heated by dielectric heating is 1.5 times or more than that of the second ink In2.

The discharge control unit 250 is implemented by a computer including one or a plurality of processors, a storage device, and an input and output interface for inputting and outputting signals to and from an outside. The discharge control unit 250 controls the discharge unit 210 and the first transport unit 325 to discharge a liquid and cause the liquid to adhere to the medium Md while transporting the medium Md. In another embodiment, the discharge control unit 250 may be implemented by, for example, a combination of a plurality of circuits.

Figure 2:
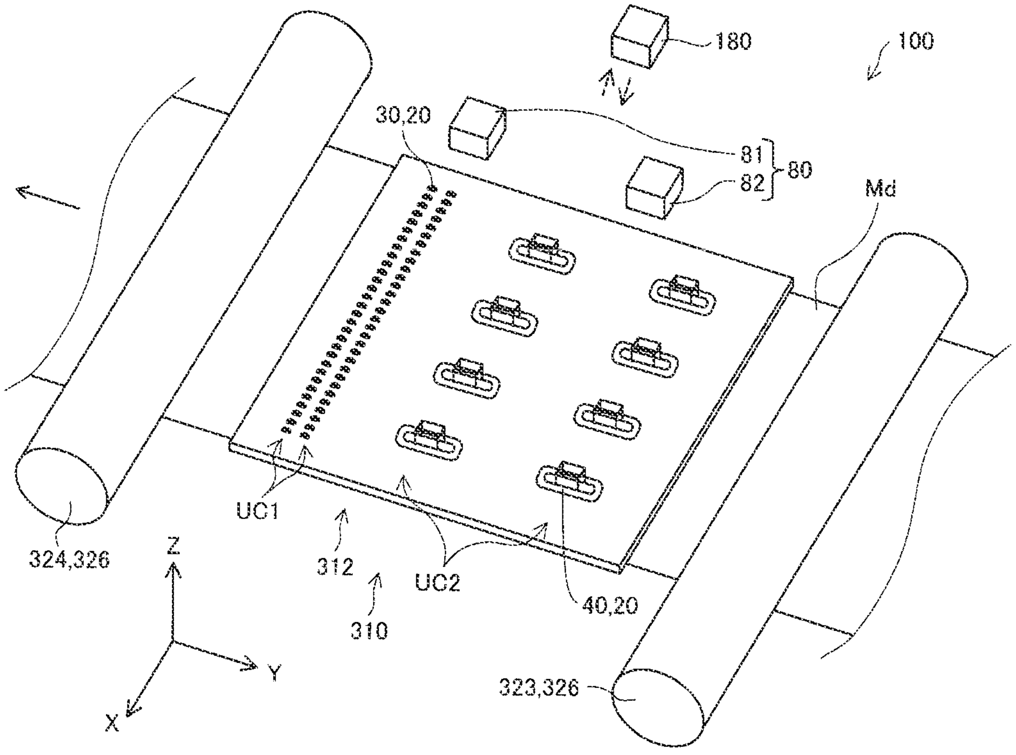
FIG. 2 is a perspective view showing a schematic configuration of a dielectric heating apparatus.

FIG. 2 is a perspective view showing a schematic configuration of the dielectric heating apparatus 100 according to the first embodiment. As shown in FIGS. 1 and 2, the dielectric heating apparatus 100 includes an electrode unit 20 that heats the first ink In1 and the second ink In2 adhering to the medium Md, a voltage application unit 80 that applies an AC voltage to the electrode unit 20, the second transport unit 326 described above, and a heating control unit 180.

In the dielectric heating apparatus 100 according to the present embodiment, the first ink In1 and the second ink In2 adhering to the medium Md are dried by heating the first ink In1 and the second ink In2 by an electric field generated from the electrode unit 20 in the second section 312 while transporting the medium Md by the second transport unit 326. That is, in the present embodiment, as shown in FIG. 1, the electrode unit 20 heats the first ink In1 and the second ink In2 downstream of a position in the transport path 310 where the discharge unit 210 causes the first ink In1 and the second ink In2 to adhere to the medium Md.

As shown in FIGS. 1 and 2, the dielectric heating apparatus 100 includes a first electrode unit 30 and a second electrode unit 40 as the electrode unit 20. As shown in FIG. 1, the first electrode unit 30 includes a first electrode 31 and a second electrode 32 that face the medium Md. The second electrode unit 40 includes a third electrode 41 and a fourth electrode 42 that face the medium Md.

As shown in FIG. 2, the dielectric heating apparatus 100 according to the present embodiment includes a total of 60 first electrode units 30 and a total of eight second electrode units 40. More specifically, the dielectric heating apparatus 100 includes first unit rows UC1 and second unit rows UC2. The first unit row UC1 includes 30 first electrode units 30 disposed side by side in the X direction, and two first unit rows UC1 are disposed side by side in the Y direction. The second unit row UC2 includes four second electrode units 40 disposed side by side in the X direction, and two second unit rows UC2 are disposed side by side in the Y direction.

As shown in FIGS. 1 and 2, the first unit rows UC1 are disposed at a position in the −Y direction of the second unit rows UC2. That is, in the transport path 310, a position where the first electrode unit 30 heats the medium Md is downstream of a position where the second electrode unit 40 heats the medium Md. Accordingly, the first electrode unit 30 heats the first ink In1 and the second ink In2 after the second electrode unit 40 heats the first ink In1 and the second ink In2.

In the present embodiment, the dielectric heating apparatus 100 includes a first voltage application unit 81 and a second voltage application unit 82 as the voltage application unit 80 described above. The first voltage application unit 81 applies an AC voltage having a frequency of 300 MHz or more and 300 GHz or less to the first electrode 31 and the second electrode 32 of the first electrode unit 30. The second voltage application unit 82 applies an AC voltage of 100 kHz or more and 300 MHz or less to the third electrode 41 and the fourth electrode 42 of the second electrode unit 40. More specifically, in the present embodiment, the first voltage application unit 81 applies a high-frequency voltage of 1 GHz to the first electrode 31 and the second electrode 32. The second voltage application unit 82 applies a high-frequency voltage of 40.68 MHz to the third electrode 41 and the fourth electrode 42. In the present specification, a high-frequency voltage refers to an AC voltage having a frequency of 1 MHz or more.

The first voltage application unit 81 according to the present embodiment is implemented as a high-frequency power supply including a high-frequency voltage generation circuit, and outputs a high-frequency voltage. The first voltage application unit 81 includes, for example, a crystal oscillator, a phase locked loop (PLL) circuit, and a power amplifier. The first voltage application unit 81 amplifies a high-frequency signal generated in the PLL circuit by the power amplifier and supplies the amplified high-frequency signal to the first electrode unit 30 via a coaxial cable or the like, thereby applying the high-frequency voltage to the first electrode 31 and the second electrode 32. One of potentials to be applied to the first electrode 31 and the second electrode 32 may be a reference potential. The reference potential is a constant potential serving as a reference of the high-frequency voltage, and is, for example, a ground potential. A configuration of the second voltage application unit 82 is the same as that of the first voltage application unit 81 except that the second voltage application unit 82 applies an AC voltage to the third electrode 41 and the fourth electrode 42, and thus a description thereof will be omitted.

The heating control unit 180 is implemented by a computer similar to the discharge control unit 250 described above. The heating control unit 180 controls the units described above such as the second transport unit 326 and the voltage application unit 80 to heat the first ink In1 and the second ink In2 adhering to the medium Md in the dielectric heating apparatus 100. The heating control unit 180 may be simply referred to as a control unit.

Figure 3:
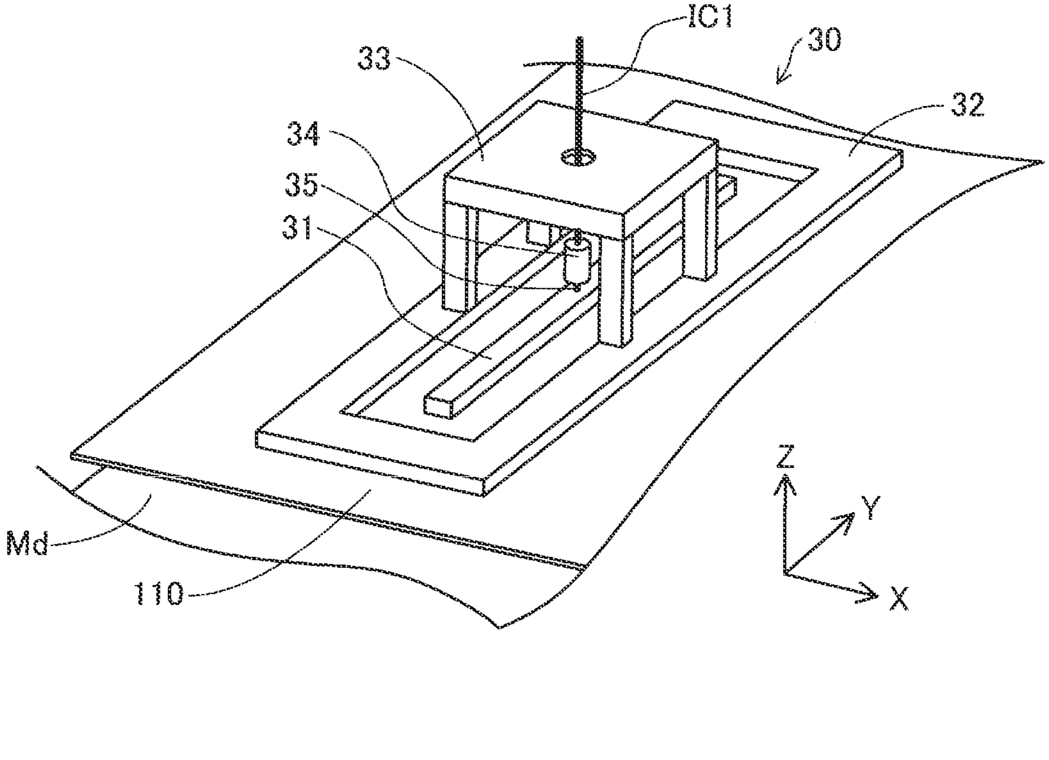
FIG. 3 is a perspective view showing a schematic configuration of a first electrode unit.

FIG. 3 is a perspective view showing a schematic configuration of the first electrode unit 30 according to the present embodiment. As described above, the first electrode unit 30 includes the first electrode 31 and the second electrode 32. In addition, the first electrode unit 30 according to the present embodiment includes a first coil 34.

The first electrode 31 and the second electrode 32 are conductors, and are formed of, for example, a metal, an alloy, and a conductive oxide. The first electrode 31 and the second electrode 32 may be formed of the same material or may be formed of different materials. For example, the first electrode 31 and the second electrode 32 may be disposed at a substrate or the like formed of a material having a low dissipation factor or low conductivity for a purpose of maintaining a posture and an intensity thereof, or may be supported by another member.

The first electrode 31 and the second electrode 32 are disposed such that a shortest distance between the first electrode 31 and the second electrode 32 is equal to or less than one-tenth of a wavelength of an electromagnetic field output from the first electrode unit 30. The first electrode 31 and the second electrode 32 according to the present embodiment have a flat plate shape that is flat in the X direction and the Y direction. The first electrode 31 and the second electrode 32 have a rectangular shape in which the Y direction is a longitudinal direction and the X direction is a lateral direction when viewed along the Z direction. The second electrode 32 is disposed to surround a periphery of the first electrode 31 when viewed along the Z direction. More specifically, the first electrode 31 is disposed in a rectangular-shaped opening that is provided in a central portion of the second electrode 32 in the X direction and the Y direction and penetrates the second electrode 32 in the Z direction.

The first electrode 31 and the second electrode 32 are both disposed at a substrate 110 disposed parallel to the X direction and the Y direction. More specifically, the first electrode 31 is disposed such that a lower surface thereof is in contact with an upper surface of the substrate 110. The second electrode 32 is disposed such that a lower surface thereof is in contact with the upper surface of the substrate 110. Therefore, in the present embodiment, a central portion of the lower surface of the first electrode 31 and the lower surface of the second electrode 32 are disposed at the same plane. In the present embodiment, the substrate 110 is provided in common to all of the first electrode units 30 and the second electrode units 40.

In the second section 312, both the first electrode 31 and the second electrode 32 are disposed to face the medium Md transported in the −Y direction by the second transport unit 326 in the Z direction. In the present embodiment, the first electrode 31 and the second electrode 32 are disposed above the second section 312. That is, in the present embodiment, the lower surfaces of the first electrode 31 and the second electrode 32 face an upper surface of the medium Md. The substrate 110 described above is disposed between the medium Md and the first electrode 31 and the second electrode 32.

In the present embodiment, the substrate 110 is formed of glass. The substrate 110 prevents the first ink In1 and the second ink In2 applied to the medium Md from adhering to the first electrode 31 and the second electrode 32, and prevents, when the medium Md is the cloth, fluff of the medium Md from adhering to the first electrode 31 and the second electrode 32. Similarly, in the present embodiment, the substrate 110 also prevents the inks and the fluff from adhering to the third electrode 41 and the fourth electrode 42. In another embodiment, the substrate 110 may be formed of, for example, alumina.

In the present embodiment, the first electrode 31 is electrically coupled to the first voltage application unit 81 via a first electric wire 35, the first coil 34, and an internal conductor IC1 of the coaxial cable. The second electrode 32 is electrically coupled to the first voltage application unit 81 via a coupling member 33 disposed above the second electrode 32, an external conductor (not shown) of the coaxial cable, or the like.

When the AC voltage is applied to the first electrode 31 and the second electrode 32, an electromagnetic field having a wavelength $\lambda_1$ corresponding to a frequency $f_1$ of the applied AC voltage is generated from the first electrode 31 and the second electrode 32. An intensity of the electromagnetic field is extremely high in the vicinity of the first electrode 31 and the second electrode 32, and is extremely low at a location far away from the first electrode 31 and the second electrode 32. In the present specification, the electromagnetic field generated in the vicinity of the first electrode 31 and the second electrode 32 by the application of the AC voltage is referred to as a "vicinity electromagnetic field". The term "vicinity" of the first electrode 31 and the second electrode 32 refers to a range in which a distance from the first electrode 31 and the second electrode 32 is equal to or less than ½π of the wavelength of the generated electromagnetic field. A range farther than the "vicinity" is referred to as "far". In the present specification, an electromagnetic field generated far from the first electrode 31 and the second electrode 32 by the application of the AC voltage is referred to as a "far electromagnetic field". The far electromagnetic field corresponds to an electromagnetic field used for communication by a general communication antenna or the like.

As described above, the first electrode 31 and the second electrode 32 are disposed such that the shortest distance therebetween is equal to or less than one-tenth of the wavelength of the electromagnetic field. Accordingly, an electric field density of the electromagnetic field generated from the first electrode 31 and the second electrode 32 can be attenuated in the vicinity of the first electrode 31 and the second electrode 32. Therefore, by appropriately maintaining a distance between the medium Md and the first electrode 31 and the second electrode 32, radiation of the far electromagnetic field from the first electrode 31 and the second electrode 32 can be prevented while efficiently heating the first ink In1 and the second ink In2 adhering to the medium Md by the electric field generated in the vicinity of the first electrode 31 and the second electrode 32. In particular, in the present embodiment, since the second electrode 32 is disposed to surround the first electrode 31 when viewed along the Z direction, the radiation of the far electromagnetic field from the first electrode 31 and the second electrode 32 can be further prevented.

According to a preliminary experiment performed by inventors, it is found that even when a microwave is emitted to a sheet to which an ink adheres in a microwave oven, the ink adhering to the sheet is hardly heated. A reason thereof is considered to be that the microwave penetrates through a thin ink film, and electric power converted into heat inside the ink among electric power of the emitted microwaves is extremely low. In contrast, according to the electrode unit 20 of the present embodiment, since the electromagnetic field in a direction intersecting a film pressure direction of the ink can be emitted to the ink adhering to the medium Md, the ink can be effectively heated.

In the present embodiment, one end of the first coil 34 is electrically coupled in series to the first electrode 31 via the first electric wire 35, and the other end thereof is electrically coupled in series to the first voltage application unit 81. In the present embodiment, the first coil 34 is implemented by a solenoid coil, and is disposed such that a length direction thereof is along the Z direction. A shape, a length, a cross-sectional area, the number of turns, a material, and the like of the first coil 34 are selected, for example, to form a resonant circuit that resonates at the frequency $f_1$ together with the first electrode 31 and the second electrode 32, and to implement impedance matching between the first electrode unit 30 and the first voltage application unit 81.

When the first voltage application unit 81 applies the AC voltage to the first electrode unit 30, a high voltage is generated at one end of the first coil 34. Accordingly, the intensity of the electric field generated from the first electrode 31 and the second electrode 32 can be increased. The first coil 34 is preferably disposed such that a distance between the one end of the first coil 34 and the first electrode 31 is as small as possible. When the distance between the one end of the first coil 34 and the first electrode 31 is large, the high voltage generated at the one end of the first coil 34 may generate an electric field that does not contribute to heating of the medium Md between the first coil 34 and the first electrode 31 or between the first electric wire 35 and the second electrode 32, and an effect of increasing the intensity of the electric field generated from the first electrode 31 and the second electrode 32 may be reduced. In contrast, by reducing the distance between the one end of the first coil 34 and the first electrode 31, the generation of the electric field that does not contribute to the heating of the medium Md can be prevented, and therefore the intensity of the electric field generated from the first electrode 31 and the second electrode 32 can be effectively increased. In another embodiment, for example, the first electrode 31 may be formed in a meander shape to cause the first electrode 31 to exhibit the same function as the first coil 34.

Figure 4:
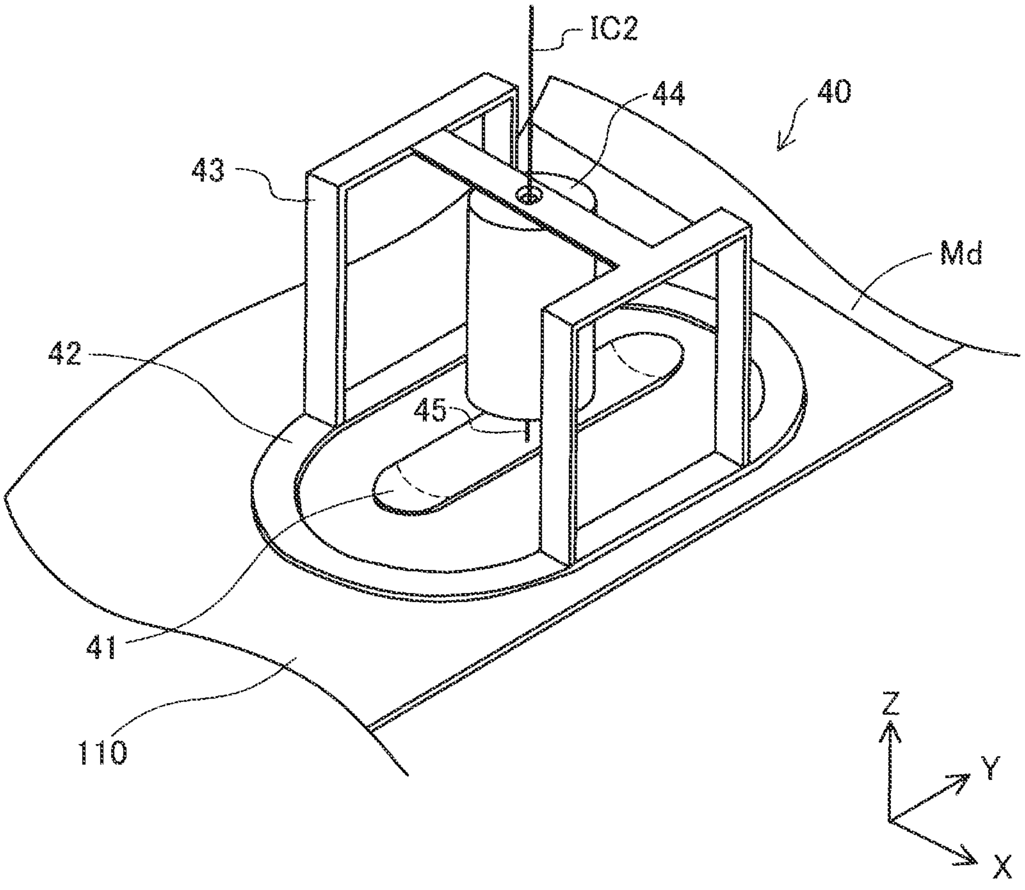
FIG. 4 is a perspective view showing a schematic configuration of a second electrode unit.

FIG. 4 is a perspective view showing a schematic configuration of the second electrode unit 40 according to the present embodiment. As described above, the second electrode unit 40 includes the third electrode 41 and the fourth electrode 42. In addition, the second electrode unit 40 according to the present embodiment includes a second coil 44.

The third electrode 41 and the fourth electrode 42 are conductors similarly to the first electrode 31 and the second electrode 32. The third electrode 41 and the fourth electrode 42 are disposed such that a shortest distance between the third electrode 41 and the fourth electrode 42 is equal to or less than one-tenth of a wavelength of an electromagnetic field output from the second electrode unit 40. The third electrode 41 according to the present embodiment has a boat shape in which the Y direction is the longitudinal direction and the X direction is the lateral direction. A lower surface of the third electrode 41 has a curved surface shape protruding in the −Z direction. The third electrode 41 has an oval shape elongated in the Y direction when viewed along the Z direction. The fourth electrode 42 has an oval ring shape that is flat in the X direction and the Y direction and elongated in the Y direction. The fourth electrode 42 is disposed to surround a periphery of the third electrode 41 when viewed along the Z direction. In the present embodiment, a dimension of the fourth electrode 42 in the Y direction is about six times a dimension of the second electrode 32 in the Y direction. Further, a dimension of the fourth electrode 42 in the X direction is about 8.5 times a dimension of the second electrode 32 in the X direction.

The third electrode 41 and the fourth electrode 42 are disposed at the substrate 110 similarly to the first electrode 31 and the second electrode 32. More specifically, the third electrode 41 is disposed such that a central portion of a lower surface of the third electrode 41 in the X direction and the Y direction is in contact with the upper surface of the substrate 110. The fourth electrode 42 is disposed such that a lower surface of the fourth electrode 42 is in contact with the upper surface of the substrate 110. Therefore, in the present embodiment, the central portion of the lower surface of the third electrode 41 and the lower surface of the fourth electrode 42 are disposed at the same plane.

Similar to the first electrode 31 and the second electrode 32, in the second section 312, both the third electrode 41 and the fourth electrode 42 are disposed to face the medium Md transported in the −Y direction by the second transport unit 326 in the Z direction.

In the present embodiment, the third electrode 41 is electrically coupled to the second voltage application unit 82 via a second electric wire 45, the second coil 44, and an internal conductor IC2 of the coaxial cable. The fourth electrode 42 is electrically coupled to the second voltage application unit 82 via a second coupling member 43 disposed above the fourth electrode 42, an external conductor (not shown) of the coaxial cable, or the like. When the AC voltage is applied to the third electrode 41 and the fourth electrode 42, an electromagnetic field having a wavelength $\lambda_2$ corresponding to a frequency $f_2$ of the applied AC voltage is generated from the third electrode 41 and the fourth electrode 42.

In the present embodiment, one end of the second coil 44 is electrically coupled in series to the third electrode 41 via the second electric wire 45, and the other end thereof is electrically coupled in series to the second voltage application unit 82. In the present embodiment, the second coil 44 is implemented by a solenoid coil, and is disposed such that a length direction thereof is along the Z direction. A shape, a length, a cross-sectional area, the number of turns, a material, and the like of the second coil 44 are selected, for example, to form a resonant circuit that resonates at the frequency $f_2$ together with the third electrode 41 and the fourth electrode 42, and to implement impedance matching between the second electrode unit 40 and the second voltage application unit 82. The second coil 44 is preferably disposed such that a distance between the one end of the second coil 44 and the third electrode 41 is as small as possible.

Figure 5:
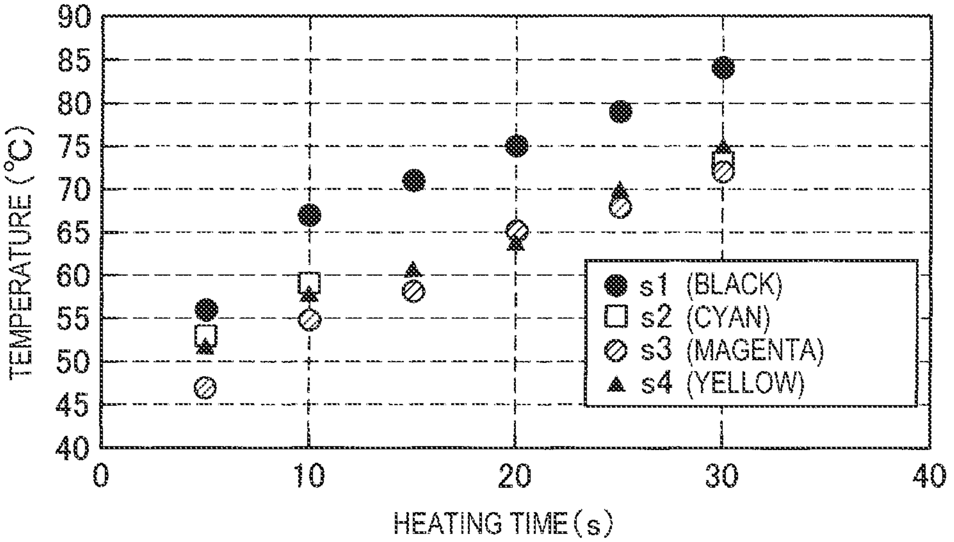
FIG. 5 is a first graph in which a horizontal axis represents a heating time of each sample and a vertical axis represents a temperature.
Figure 6:
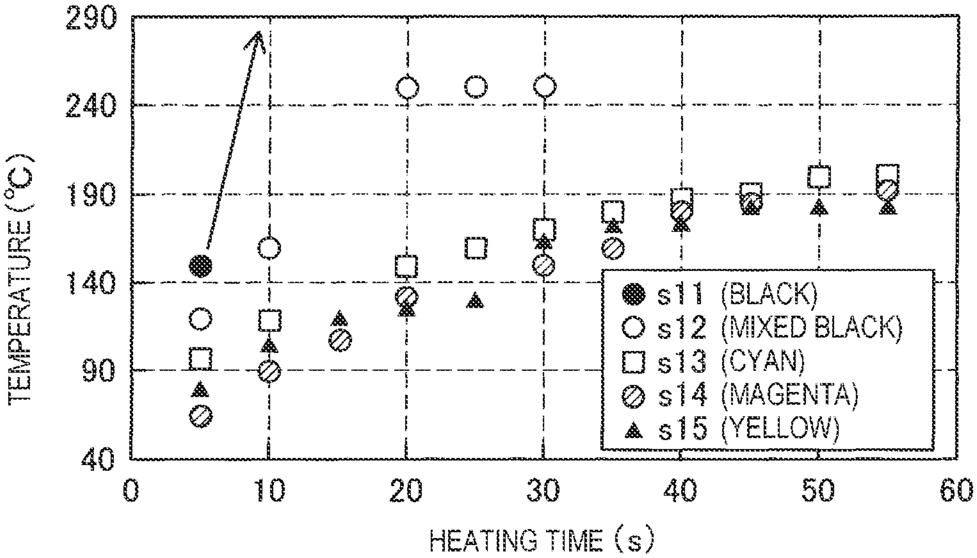
FIG. 6 is a second graph in which a horizontal axis represents a heating time of each sample and a vertical axis represents a temperature.

FIG. 5 is a first graph in which a horizontal axis represents a heating time of samples to which the inks adhere and a vertical axis represents a temperature of the samples when the samples are heated by the dielectric heating. Similarly, FIG. 6 is a second graph in which a horizontal axis represents the heating time of the samples and a vertical axis represents a temperature of the samples. FIG. 5 shows a correlation between the temperature of the samples and the heating time when the samples are heated by an electromagnetic field having a frequency of 1 GHz. FIG. 6 shows a correlation between the temperature of the samples and the heating time when the samples are heated by an electromagnetic field having a frequency of 40.68 MHz.

Samples s1 to s4 were prepared as samples to be heated by the electromagnetic field having the frequency of 1 GHz. Further, samples s11 to s15 were prepared as samples to be heated by the electromagnetic field having the frequency of 40.68 MHz. Sample s1 and sample s11 were produced by causing a black aqueous pigment ink containing carbon black and a resin to adhere to a rectangular cotton cloth and leaving the cloth at room temperature for 30 days. Sample s12 was produced by causing a mixed black aqueous pigment ink containing carbon black and a resin to adhere to the same cloth, and similarly leaving the cloth at room temperature. Sample s2 and sample s13 were produced by causing a cyan aqueous pigment ink containing a resin to adhere to the same cloth and similarly leaving the cloth at room temperature. Sample s3 and sample s14 were produced by causing a magenta aqueous pigment ink containing a resin to adhere to the same cloth and similarly leaving the cloth at room temperature. Sample s4 and sample s15 were produced by causing a yellow aqueous pigment ink containing a resin to adhere to the same cloth and similarly leaving the cloth at room temperature. Sample s1, sample s11, and sample s12 correspond to the medium Md to which only the first ink In1 adheres, and the other samples correspond to the medium Md to which only the second ink In2 adheres. The cloth used in the production of samples s1 to s4 has dimensions corresponding to external dimensions of the second electrode 32 in the X direction and the Y direction when viewed along the Z direction. The cloth used in the production of samples s11 to s15 has dimensions corresponding to the external dimensions of the second electrode 32 in the X direction and the Y direction when viewed along the Z direction. Further, the inks used in the production of the samples contain glycerin.

Samples s1 to s4 were heated by the first electrode unit 30 described above. More specifically, the samples were disposed each facing the first electrode 31 and the second electrode 32 of one first electrode unit 30, and each of the samples was heated by applying the high-frequency voltage of 1 GHz to the first electrode 31 and the second electrode 32. The temperature of each of the samples was measured by an infrared camera. Similarly, samples s11 to s15 were each heated by one second electrode unit 40 described above. At a time of heating the samples, electric power applied to the first electrode unit 30 was set to 2 W, and electric power applied to the second electrode unit 40 was set to 50 W. The "heating time" shown in FIGS. 5 and 6 represents a time elapsed from when the high-frequency voltage is started to be applied to the first electrode 31 and the second electrode 32, and the "temperature" represents a maximum in-plane temperature of each sample measured by the infrared camera at a certain point in time.

As shown in FIG. 6, when sample s11 was heated by the electromagnetic field having the frequency of 40.68 MHz, a temperature thereof rapidly rose, and became unmeasurable before the heating time reached 10 seconds. In contrast, when the heating time was 10 seconds, the temperature of sample s13 was about 120° C., the temperature of sample s14 was about 90° C., and the temperature of sample s15 was about 110° C. Further, when the heating time was 20 seconds, the temperature of sample s12 was about 250° C., the temperature of sample s13 was about 150° C., and the temperatures of sample s14 and sample s15 were about 130° C.

As shown in FIG. 5, when sample s1 was heated by the electromagnetic field having the frequency of 1 GHz, the temperature of sample s1 was higher than that of samples s2 to s4 heated in the same way even in the same heating time. Meanwhile, in sample s1, the rapid temperature rise as in sample s11 in FIG. 6 was not observed. More specifically, for example, when the heating time was 10 seconds, the temperature of sample s1 was about 67° C., the temperature of sample s2 was about 59° C., the temperature of sample s3 was about 55° C., and the temperature of sample s4 was about 58° C. Therefore, a temperature difference between sample s1 and the other samples was about 8° C. to 12° C. Further, even the heating time was 30 seconds, the temperature difference between sample s1 and the other samples was substantially the same as that described above, and was about 10° C. to 13° C. This is considered to be because when the ink containing carbon black is heated by the electromagnetic field having the frequency of 40.68 MHz, heat generated due to conductivity of carbon black predominantly contributes to the temperature rise of the ink, whereas when the ink is heated by the electromagnetic field having the frequency of 1 GHz, heat generated due to a dissipation factor of the ink dominantly contributes to the temperature rise of the ink. Therefore, when the first ink In1 and the second ink In2 are heated by the first electrode unit 30, both the first ink In1 and the second ink In2 can be heated and dried while preventing the rapid temperature rise of the first ink In1.

As shown in FIG. 6 described above, when the frequency was 40.68 MHz, for example, when the heating time was 10 seconds, the temperature of sample s14 did not reach 100° C., whereas the temperature of sample s11 exceeded 240° C.

Therefore, when the first ink In1 and the second ink In2 adhering to the medium Md are continuously heated only by the second electrode unit 40, there is a high possibility that burning or the like of the medium Md to be described later occurs in the vicinity of a position of the medium Md to which the first ink In1 adheres before the solvent such as water is sufficiently evaporated or sufficiently volatilized in the vicinity of a position of the medium Md to which the second ink In2 adheres. In contrast, as in the present embodiment, by the first electrode unit 30 heating the first ink In1 and the second ink In2 after the second electrode unit 40 heats the first ink In1 and the second ink In2, both inks can be efficiently heated, and uneven heating can be prevented. More specifically, when an amount of the solvent such as water contained in the first ink In1 adhering to the medium Md is sufficiently large, the heat caused by the conductivity of carbon black described above is taken away by the solvent. Therefore, by heating both inks by the second electrode unit 40 while the amount of the solvent contained in both inks is sufficiently large, and then heating both inks by the first electrode unit 30 before the solvent disappears due to evaporation, both inks can be efficiently heated and dried without unevenness. In this case, since vapor of the solvent contained in the inks is more likely to be generated in the vicinity of the second electrode unit 40 than in the vicinity of the first electrode unit 30, for example, a blower fan or the like for generating an airflow may be provided in the vicinity of the second electrode unit 40.

In the present embodiment, the heating control unit 180 of the dielectric heating apparatus 100 controls the first voltage application unit 81 to control the electric power applied to the first electrode 31 and the second electrode 32, thereby heating the first ink In1 and the second ink In2 to a temperature of 150° C. or more and 240° C. or less. More specifically, for example, the heating control unit 180 performs feedback control of the electric power applied to the first electrode 31 and the second electrode 32, while referring to the temperatures of both inks acquired by an infrared camera, a temperature sensor, or the like (not shown) disposed in the vicinity of the first electrode unit 30. In this case, the heating control unit 180 may refer to the temperature of the medium Md as the temperatures of both inks.

By heating both inks to the temperature of 150° C. or more, a pigment can be firmly fixed to the medium Md via the resins contained in both inks. In particular, in the present embodiment, after the solvents contained in both inks are dried by the second electrode unit 40, the resins contained in both inks can be heated to 150° C. or more by the first electrode unit 30, and therefore the both inks can be dried efficiently and the pigments can be firmly fixed to the medium Md via the resins. In addition, by heating both inks to the temperature of 240° C. or less, for example, when the medium Md is a sheet containing cellulose as a main component or cloth made of cotton or hemp similarly containing cellulose as a main component, the burning of the medium Md can be prevented. In addition, when the medium Md is cloth made of polyester, melting of the medium Md can be prevented, and when the medium Md is cloth made of rayon, coloring decomposition of the medium Md can be prevented.

As described above, as the frequency of the AC voltage applied to the first electrode 31 and the second electrode 32 by the first voltage application unit 81, a frequency of 300 MHz or more and 300 GHz or less corresponding to a frequency of microwaves in a broad sense can be used in addition to the frequency of 1 GHz. In general, in this frequency range, a dissipation factor of a substance such as water is large, and an AC resistance of carbon black is increased due to a skin effect. Therefore, by heating the first ink In1 and the second ink In2 using the electromagnetic field in this frequency range, the heat generated due to the dissipation factors of both inks can dominantly contribute to the temperature rise of both inks. In this case, it is particularly preferable to use a frequency of 300 MHz or more and 30 GHz or less, which corresponds to a frequency generally used in microwave heating. For example, frequencies of 915 MHz, 2.45 GHz, 5.8 GHz, and 24.125 GHz, which are defined as industrial scientific and medical (ISM) bands, may be used.

As described above, as the frequency of the AC voltage applied to the third electrode 41 and the fourth electrode 42 by the second voltage application unit 82, a frequency of 100 kHz or more and less than 300 MHz can be used in addition to the frequency of 40.68 MHz. In general, in this frequency range, the dissipation factor of the substance such as water is small, and an influence of the skin effect is small. Therefore, by heating the first ink In1 using an electromagnetic field in this frequency range, the heat generated due to the conductivity of carbon black can dominantly contribute to the temperature rise of the first ink In1 and the second ink In2. Accordingly, as described above, the rapid heat generation of the first ink In1 can be used for heating the first ink In1 and the second ink In2. For example, frequencies of 13.56 MHz and 27.12 MHz, which are frequencies other than 40.68 MHz, may be used among the frequencies defined as the ISM band.

The dielectric heating apparatus 100 according to the first embodiment described above includes: as the electrode unit 20 that heats the first ink In1 and the second ink In2 adhering to the medium Md, the first electrode unit 30 including the first electrode 31 and the second electrode 32; and the first voltage application unit 81 that applies the AC voltage having the frequency of 300 MHz or more and 300 GHz or less to the first electrode 31 and the second electrode 32. Accordingly, both the first ink In1 containing carbon black and the second ink In2 not containing carbon black, which adhere to the medium Md, can be heated by the first electrode unit 30 while preventing the uneven heating. Therefore, after only the second ink In2 adhering to the medium Md is dried by the dielectric heating, there is no need to further cause the first ink In1 to adhere to the medium Md. Therefore, a deviation of an adhesion position of the first ink In1 and the second ink In2 can be prevented.

According to the dielectric heating apparatus 100 of the present embodiment, the first ink In1 and the second ink In2 are pigment inks containing the resin, and the discharge control unit 250 controls the first voltage application unit 81 to heat the first ink In1 and the second ink In2 to the temperature of 150° C. or more and 240° C. or less. Accordingly, since the inks are heated to the temperature of 150° C. or more, the pigments can be firmly fixed to the medium Md via the resins contained in the inks, and an abrasion resistance of the pigment in the medium Md can be increased. Further, since the inks are heated to the temperature of 240° C. or less, the burning, the melting, discoloration, and the like of the medium Md due to the heating can be prevented.

The dielectric heating apparatus 100 according to the present embodiment further includes: the second electrode unit 40 as the electrode unit 20, the second electrode unit 40 including the third electrode 41 and the fourth electrode 42; and the second voltage application unit 82 that applies the AC voltage having the frequency of 100 kHz or more and less than 300 MHz to the third electrode 41 and the fourth electrode 42. The first electrode unit 30 heats the first ink In1 and the second ink In2 after the second electrode unit 40 heats the first ink In1 and the second ink In2. Accordingly, the first ink In1 and the second ink In2 can be efficiently heated and dried without the unevenness. Further, in the present embodiment, when the first ink In1 and the second ink In2 are pigment inks containing the resin, the pigments can be firmly fixed to the medium Md via the resin while efficiently drying both inks.

According to the printing system 200 of the present embodiment, the discharge unit 210 causes the first ink In1 and the second ink In2 to adhere to the medium Md in the first section 311 of the transport path 310, and the electrode unit 20 of the dielectric heating apparatus 100 heats the first ink In1 and the second ink In2 in the second section 312 downstream of the first section 311. Therefore, a degree of freedom in an arrangement of the electrode unit 20 and the discharge unit 210 in the printing system 200 can be increased as compared to a case where the inks are caused to adhere to and heated in the same section of the transport path 310. For example, in the first embodiment, the medium Md is transported in the −Y direction in both the first section 311 and the second section 312, whereas the medium Md may be transported in different directions in the sections. For example, after the medium Md is transported in the −Y direction in the first section 311, the medium Md may be transported in a +Y direction in the second section 312 through a direction change by rollers (not shown). Accordingly, a size of the printing system 200 can be reduced in the Y direction.

In addition, according to the printing system 200 of the present embodiment, the first section 311 and the second section 312 are separated from each other. Therefore, the degree of freedom in the arrangement of the electrode unit 20 and the discharge unit 210 in the printing system 200 can be further increased. For example, in the first embodiment, the medium Md is continuously transported from the liquid discharge device 205 to the dielectric heating apparatus 100, whereas the medium Md may not be continuously transported from the liquid discharge device 205 to the dielectric heating apparatus 100. In this case, for example, the medium Md to which the first ink In1 and the second ink In2 discharged by the liquid discharge device 205 adhere is once wound in a roll shape, the wound medium Md is moved to the dielectric heating apparatus 100 by a robot or the like, and then the medium Md can be heated while the wound medium Md is unwound and transported in the dielectric heating apparatus 100. In this way, for example, in the printing system 200, the liquid discharge device 205 and the dielectric heating apparatus 100 can be easily disposed to be separated from each other.

B. Other Embodiments (B-1) In the embodiment described above, the first ink In1 and the second ink In2 are pigment inks containing the resin. In contrast, for example, the first ink In1 and the second ink In2 may not contain the resin, and may be dye inks instead of pigment inks. Further, the heating control unit 180 may not heat the first ink In1 and the second ink In2 to a temperature of 150° C. or more and 240° C. or less. For example, when the first ink In1 and the second ink In2 are aqueous inks not containing the resin, the heating control unit 180 may heat both inks to a temperature of 100° C. or more and less than 150° C.

(B-2) In the embodiment described above, the second electrode 32 is disposed to surround the first electrode 31 when viewed along the Z direction. In contrast, the second electrode 32 may not be disposed to surround the first electrode 31 when viewed along the Z direction. For example, the first electrode 31 and the second electrode 32 may be disposed to be adjacent to each other when viewed along the Z direction. In this case, shapes of the first electrode 31 and the second electrode 32 may be freely selected, and may be a circular shape, an oval shape, a rectangular shape, a polygonal shape, or the like. When viewed along the Z direction, areas of the first electrode 31 and the second electrode 32 may be the same as or different from each other. When viewed along the Z direction, the first electrode 31 and the second electrode 32 are preferably disposed so as not to overlap each other. Similarly, the fourth electrode 42 may not be disposed to surround the third electrode 41 when viewed along the Z direction, and for example, the third electrode 41 and the fourth electrode 42 may be disposed to be adjacent to each other when viewed along the Z direction.

(B-3) In the embodiment described above, the second electrode unit 40 is provided as the electrode unit 20 in addition to the first electrode unit 30. In contrast, the second electrode unit 40 may not be provided.

(B-4) In the embodiment described above, the dielectric heating apparatus 100 includes two first unit rows UC1 and two second unit rows UC2, and includes a total of 60 first electrode units 30 and a total of eight second electrode units 40. In contrast, the number of the first unit rows UC1 and the number of the second unit rows UC2 may be one, or may be three or more. When a plurality of the first unit rows UC1 and a plurality of the second unit rows UC2 are provided, the number of the first electrode units 30 and the number of the second electrode units 40 may be different for each row. Further, the number of the first electrode units 30 and the number of the second electrode units 40 provided in the dielectric heating apparatus 100 may be freely selected, and may be, for example, one.

(B-5) In the embodiment described above, the first electrode unit 30 and the second electrode unit 40 may be reciprocally movable in a direction intersecting with a direction in which the medium Md is transported. For example, the first electrode unit 30 and the second electrode unit 40 may be supported by a driving unit (not shown) implemented by a belt mechanism or a ball screw mechanism, and may be reciprocated in an X direction.

C. Other Aspects

The present disclosure is not limited to the embodiments described above, and can be implemented in various forms without departing from the spirit of the present disclosure. For example, the present disclosure can be implemented in the following aspects. To solve a part of or all of problems of the present disclosure, or to achieve a part of or all of effects of the present disclosure, technical features of the embodiment described above corresponding to technical features in the following aspects can be replaced or combined as appropriate. The technical features can be deleted as appropriate unless described as essential in the present specification.

(1) According to a first aspect of the present disclosure, a dielectric heating apparatus for heating a first ink and a second ink that adhere to a medium is provided. The first ink contains carbon black. The second ink does not contain carbon black. The dielectric heating apparatus includes: a first electrode unit as an electrode unit configured to heat the first ink and the second ink, the first electrode unit including a first electrode and a second electrode that face the medium; and a first voltage application unit configured to apply an AC voltage having a frequency of 300 MHz or more and 300 GHz or less to the first electrode and the second electrode.

According to such an aspect, both the first ink containing carbon black and the second ink not containing carbon black that adhere to the medium can be heated by the first electrode unit while preventing uneven heating. Therefore, after only the second ink adhering to the medium is dried by dielectric heating, there is no need to further cause the first ink to adhere to the medium. Therefore, a deviation of an adhesion position of the first ink and the second ink can be prevented.

(2) In the aspect described above, the dielectric heating apparatus may further include a control unit configured to control the first voltage application unit, the first ink and the second ink may be pigment inks containing a resin, and the control unit may control the first voltage application unit to heat the first ink and the second ink to a temperature of 150° C. or more and 240° C. or less. According to such an aspect, since the inks are heated to the temperature of 150° C. or more, pigments can be firmly fixed to the medium via the resins contained in the inks, and an abrasion resistance of the pigment in the medium can be increased. Further, since the inks are heated to the temperature of 240° C. or less, burning, melting, discoloration, and the like of the medium due to the heating can be prevented.

(3) In the aspect described above, the dielectric heating apparatus may further include: a second electrode unit as the electrode unit, the second electrode unit including a third electrode and a fourth electrode that face the medium; and a second voltage application unit configured to apply an AC voltage having a frequency of 100 kHz or more and less than 300 MHz to the third electrode and the fourth electrode. The first electrode unit may heat after the second electrode unit the first ink and the second ink. According to such an aspect, the first ink and the second ink can be efficiently heated and dried without unevenness by the first electrode unit and the second electrode unit.

(4) According to a second aspect of the present disclosure, a printing system is provided. The printing system includes: a discharge unit including a first discharge unit configured to discharge the first ink and cause the first ink to adhere to the medium, and a second discharge unit configured to discharge the second ink and cause the second ink to adhere to the medium; and a transport unit configured to transport the medium along a transport path. The electrode unit heats the first ink and the second ink downstream of a position in the transport path where the discharge unit causes the first ink and the second ink to adhere to the medium.

(5) In the second aspect described above, the transport unit may include a first transport unit configured to transport the medium in a first section of the transport path, and a second transport unit configured to transport the medium in a second section of the transport path downstream of the first section, the discharge unit may cause the first ink and the second ink to adhere to the medium in the first section, and the electrode unit may heat the first ink and the second ink in the second section. According to such an aspect, a degree of freedom in an arrangement of the electrode unit and the discharge unit in the printing system can be increased as compared to a case where the inks are caused to adhere to and heated in the same section of the transport path.

(6) In the second aspect described above, the first section and the second section may be separated from each other. According to such an aspect, the degree of freedom in the arrangement of the electrode unit and the discharge unit in the printing system can be further increased.

What is claimed is:

1. A dielectric heating apparatus for heating a first ink and a second ink that adhere to a medium, the first ink containing carbon black, the second ink not containing carbon black, the dielectric heating apparatus comprising:

a first electrode unit and a second electrode unit as electrode units configured to heat the first ink and the second ink, the first electrode unit including a first electrode and a second electrode that face the medium, and the second electrode unit including a third electrode and a fourth electrode that face the medium;

a first voltage application unit configured to apply an AC voltage having a frequency of 300 MHz or more and 300 GHz or less to the first electrode and the second electrode; and a second voltage application unit configured to apply an AC voltage having a frequency of 100 KHz or more and less than 300 MHz to the third electrode and the fourth electrode, wherein the first electrode unit heats the first ink and the second ink after the second electrode unit heats the first ink and the second ink.

2. The dielectric heating apparatus according to claim 1, further comprising:

a control unit configured to control the first voltage application unit, wherein the first ink and the second ink are pigment inks containing a resin, and the control unit controls the first voltage application unit to heat the first ink and the second ink to a temperature of 150° C. or more and 240° C. or less.

3. A printing system comprising:

the dielectric heating apparatus according to claim 1;

a discharge unit including a first discharge unit configured to discharge the first ink and cause the first ink to adhere to the medium, and a second discharge unit configured to discharge the second ink and cause the second ink to adhere to the medium; and a transport unit configured to transport the medium along a transport path, wherein the electrode units heat the first ink and the second ink downstream of a position in the transport path where the discharge unit causes the first ink and the second ink to adhere to the medium.

4. The printing system according to claim 3, wherein the transport unit includes a first transport unit configured to transport the medium in a first section of the transport path, and a second transport unit configured to transport the medium in a second section of the transport path downstream of the first section, the discharge unit causes the first ink and the second ink to adhere to the medium in the first section, and the electrode units heat the first ink and the second ink in the second section.

5. The printing system according to claim 4, wherein the first section and the second section are separated from each other.

* * * * *